US008832700B2

(12) United States Patent
Amin et al.

(10) Patent No.: US 8,832,700 B2
(45) Date of Patent: Sep. 9, 2014

(54) SUBSCRIBER-BASED TICKING MODEL FOR PLATFORMS

(75) Inventors: Nimesh Amin, Seattle, WA (US); Alan Chun Tung Liu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 970 days.

(21) Appl. No.: 12/893,097

(22) Filed: Sep. 29, 2010

(65) Prior Publication Data

US 2012/0079487 A1   Mar. 29, 2012

(51) Int. Cl.
*G06F 9/46* (2006.01)
*G06F 13/24* (2006.01)
*G06F 13/26* (2006.01)
*G06F 9/48* (2006.01)
*G06F 9/54* (2006.01)

(52) U.S. Cl.
CPC ............ *G06F 9/4825* (2013.01); *G06F 9/4887* (2013.01); *G06F 9/542* (2013.01); *G06F 13/26* (2013.01); *G06F 9/4812* (2013.01); *G06F 13/24* (2013.01)
USPC ............ 718/102; 718/103; 710/263; 710/264

(58) Field of Classification Search
USPC ........................................................ 718/102
See application file for complete search history.

(56) References Cited

U.S. PATENT DOCUMENTS

| | | | |
|---|---|---|---|
| 6,317,872 B1 | 11/2001 | Gee et al. | |
| 7,020,877 B2 * | 3/2006 | Dailey | 718/102 |
| 7,146,563 B2 * | 12/2006 | Hesmer et al. | 715/223 |
| 7,165,252 B1 * | 1/2007 | Xu | 718/102 |
| 7,444,638 B1 * | 10/2008 | Xu | 718/104 |
| 2004/0151129 A1 | 8/2004 | Kun-Szabo et al. | |
| 2005/0034126 A1 * | 2/2005 | Moore | 718/100 |
| 2005/0060709 A1 * | 3/2005 | Kanai et al. | 718/100 |
| 2007/0150474 A1 * | 6/2007 | Szilagyi et al. | 707/8 |
| 2009/0172621 A1 * | 7/2009 | Sathe et al. | 716/6 |
| 2010/0077035 A1 | 3/2010 | Li et al. | |
| 2010/0077394 A1 * | 3/2010 | Wang et al. | 718/1 |

OTHER PUBLICATIONS

Unknown Author, "Windows—Schedule a task", Oct. 12, 2006, retrieved at windows.microsoft.com/en-us/windows7/schedule-a-task.*
Unknown Author, "Stackoverflow—VM 2008 Periodic Tasks", Mar. 11, 2009, retrieved at: stackoverflow.com/questions/636408/vb-2008-periodic-tasks.*

(Continued)

*Primary Examiner* — Lewis A Bullock, Jr.
*Assistant Examiner* — Kevin X Lu
(74) *Attorney, Agent, or Firm* — Tony Azure; Andrew Sanders; Micky Minhas

(57) ABSTRACT

A central manager receives tick subscription requests from subscribers, including a requested period and an allowable variance. The manager selects a group period for a group of requests, based on requested period(s) and allowable variance(s). In some cases, the group period is not a divisor of every requested period but nonetheless provides at least one tick within the allowable variance of each requested period. Ticks may be issued by invoking a callback function. Ticks may be issued in a priority order based on the subscriber's category, e.g., whether it is a user-interface process. An application platform may send a tick subscription request on behalf of an application process, e.g., a mobile device platform may submit subscription requests for processes which execute on a mobile computing device. Tick subscription requests may be sent during application execution, e.g., while the application's user interface is being built or modified.

20 Claims, 3 Drawing Sheets

(56) References Cited

OTHER PUBLICATIONS

Unknown AUthor, "Cisco—Monitoring the Voice Network", Jan. 16, 2004, retrieved at: www.cisco.com/en/US/docs/ios/voice/monitor/configuration/guide/vt_mon_vc_ntwk.pdf.*

Allen Conway, "Running a Periodic Process in .NET using a Windows Service", Dec. 13, 2009, retrieved at: allen-conway-dotnet.blogspot.com/2009/12/running-periodic-process-in-net-using.html.*

Unknown Author, "Introduction to Windows Presentation Foundation", "msdn.microsoft.com/en-us/library/aa970268", Sep. 2007.*

Unknown Author, "Trees in WPF", "http://msdn.microsoft.com/en-us/library/ms753391", May 2009.*

Shawn Wildermuth, "Built More Responsive Apps with The Dispatcher", "msdn.microsoft.com/en-us/magazine/cc163328.aspx", Sep. 2007.*

Unknown Author, "Windows Timer Coalescing", Microsoft Corp, Jan. 20, 2009.*

Schoofs, et al., "A Framework for Time-Controlled and Portable WSN Applications", Retrieved at <<irserver.ucd.ie/dspace/bitstream/10197/1807/1/Schoofs-2009-A_Framework_for_Time_Controlled_and_Portable_WSN_Applications.pdf>>, Sep. 25, 2009, pp. 1-20.

S, Harish Thampi., "DSP/BIOS Timers and Benchmarking Tips", Retrieved at <<citeseerx.ist.psu.edu/viewdoc/download?doi=10.1.1.94.2802&rep=rep1&type=pdf>>, Application Report, SPRA829, Jul. 2002, pp. 21.

Younis, et al., "An Approach for Supporting Temporal Partitioning and Software Reuse in Integrated Modular Avionics", Retrieved at <<www.cs.umbc.edu/~younis/Publications/RTAS00/51_younis.pdf>>, Proceedings on Sixth IEEE Real-Time Technology and Applications Symposium, RTAS, May 31-Jun. 2, 2000, pp. 11.

Pedreiras, et al., "Task Management for Soft Real-Time Applications Based on General Purpose Operating Systems", Retrieved at <<www.ieeta.pt/%5C~pedreiras/resources/pman/wtr-pman-sync-final.pdf>>, Dec. 2007, pp. 8.

Bovet, et al., "Understanding the Linux Kernel : Chapter 10 : Process Scheduling", Retrieved at <<oreilly.com/catalog/linuxkernal/chapter/ch10.html>>, No. 0022, Oct. 2000, pp. 20.

* cited by examiner

SUBSCRIBER-BASED TICKING MODEL FOR PLATFORMS

BACKGROUND

Software "processes" may relate to time in a wide variety of ways ("process" is used broadly herein to include not only processes per se but also threads, tasks, coroutines, interrupt handlers, and other pieces of executable code). Some processes are time-sliced or otherwise share processor access with other processes. In some cases, sharing processor access makes it difficult or impractical to determine precisely when a given process will run. Some processes execute in "real" time, responding immediately (or within some specified tolerance) to movement or other real-world activity. Some processes run at periodic intervals, to service a network queue or poll hardware devices, for example.

The hardware and system software that are available to provide time-related services to processes also vary widely. Hardware support may include low-resolution or high-resolution real-time clocks, countdown timers, and hardware interrupts triggered by specified chronological conditions or events, for example. System software may include hooks for user-specified interrupt handlers, as well as particular process schedulers, device drivers, timer engines, time synchronization packets, timestamps, process priorities, and application program interfaces (APIs), for example, the details of which vary.

SUMMARY

Some applications follow a model in which a process is given a periodic "heartbeat" signal, in response to which the process services any pending requests. Choosing an effective and efficient length of time between heartbeats can be challenging. If the time between heartbeats is too large, then the response to service requests may be unacceptably slow. However, if the time between heartbeats is too small, then battery life and processor cycles may be wasted looking for service requests when none are present. Determining an efficient and effective heartbeat rate can be even more complex when multiple processes are allowed to make service requests.

Some embodiments provide subscriber-based ticking with allowable variances in the time between requested ticks and actual ticks. Ticks may be treated as heartbeats, alarms, or other time-passage indicators. A central ticking manager receives tick subscription requests from one or more subscribers. Each subscription request includes a request that a tick be issued within specified repeating intervals which are defined by a requested period and an allowable variance from the requested period. In some embodiments, a particular subscriber can submit multiple subscription requests which specify different repeating intervals and/or different variances. The manager determines the requested period for each tick subscription request, and ascertains the allowable variance for each tick subscription request, from the requests themselves, or from previously supplied configuration values or default values, for example.

Then the manager selects a group period for a group of tick subscription requests, based at least on the requested period(s) and the allowable variance(s). The group period is selected such that a sequence of ticks issued periodically at the group period would provide at least one tick for each interval of each subscription request in the group. Group period selection may involve calculating a greatest common divisor of the requested periods. However, in some embodiments the group period is not a divisor of every requested period but nonetheless provides for at least one tick within the allowable variance of each interval of the requested period.

In some embodiments, the manager checks at least once each group period for any unsatisfied tick requests and issues tick(s) to satisfy any such requests; in some embodiments, the manager checks for unsatisfied tick requests exactly once each group period. In some cases, ticks are issued by invoking a callback function which was provided to the manager by a subscriber. In some cases, the manager recognizes or imposes subscriber categories, such as user-interface/non-user-interface, and issues ticks in a priority order which depends at least in part on the subscriber categories.

In some embodiments, a platform underlying applications supports subscriber-based ticking with allowable variances. The platform locates an application process which requires periodic servicing at an interval, and identifies a service interval for the application process (based, e.g., on the application ID, the process ID, the presence of particular service calls within the process, and/or other criteria). The platform sends a central ticking manager a tick subscription request on behalf of the application process. The tick subscription request specifies the service interval as a requested period and also specifies an allowable variance from the service interval, based, e.g., on factors such as those used in selecting the service interval. In some cases, the application process may service different kinds of requests. Then the platform may send the central ticking manager multiple tick subscription requests on behalf of the application process, with different service intervals requested based on differences in expected activity by the application process in response to the ticks, e.g., for servicing network I/O versus servicing a CPU-bound process such as image rendering. Other features noted above may also be employed here and in other embodiments, such as relative priorities, callback functions, and so on, as well as various tick mechanisms such as software signals, interrupts, software events, and software messages.

In some embodiments, the tick subscription requests may be sent during execution on the platform of an application which owns the application process in question. For example, subscription requests may be sent while a user interface of the application is being built or modified during execution on the platform of the application which owns the application process that will receive the ticks. In particular, in some embodiments subscription requests are sent while a visual tree of the application is being modified on the platform.

Some embodiments include a logical processor, a memory in operable communication with the logical processor, a group of tick subscription requests in the memory, and a central ticking manager in the memory. The manager has code configured to select a group period for the group of tick subscription requests based at least on their requested periods and allowable variances, such that a sequence of ticks issued periodically at the group period will provide at least one tick for each interval of each subscription request. As an example, a mobile computing device platform may submit tick subscription requests for processes which execute on a mobile computing device.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
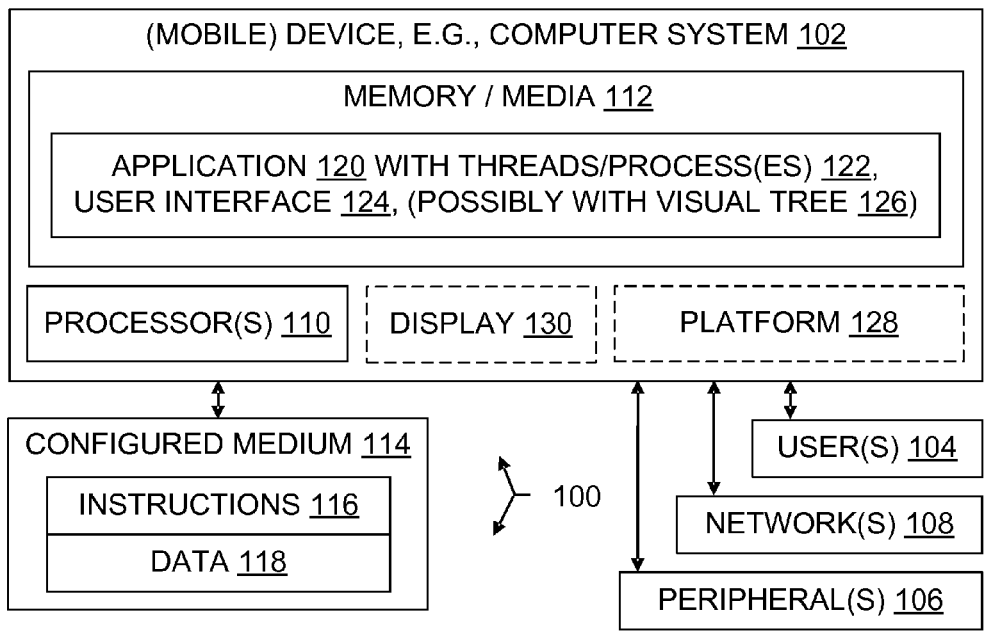
FIG. 1 is a block diagram illustrating a mobile device or other computer system having at least one processor, at least one memory, at least one process which is configured to provide a service at intervals, and other items in an operating environment which may be present on multiple network nodes, and also illustrating configured storage medium embodiments.

Some applications follow a model in which a process is given a periodic "heartbeat" signal, in response to which the process services any pending requests. Determining an efficient and effective heartbeat rate can be challenging when multiple processes are allowed to make service requests. If the time between heartbeats is too large, then the response to service requests may be unacceptably slow. For instance, user interface threads which respond too slowly may seriously degrade a user's experience with a device. However, if the time between heartbeats is too small, then battery life and processor cycles may be wasted looking for service requests when none are present. Conserving battery charge may be a high priority on mobile devices, such as mobile phones, mobile credit card readers, mobile scanners that read bar codes and other printed or radio frequency identifications, and so on.

Some embodiments described herein provide a subscriber based model, in which individual subsystems that wish to be serviced at some interval can register themselves to receive ticks. If several subscribers seeking ticks at different intervals are combined, a greatest common divisor (GCD) can be computed as part of selecting an interval that is used to service all subscribers.

In some embodiments, third-party applications receiving ticks are not aware of the presence of other tick subscribers, or even of the subscriber model and subscription details. Instead, an underlying platform automatically subscribes the applications to receive ticks, based on what each application is doing, e.g., servicing network requests, servicing user interface requests, rendering images, and so on. In this manner, application developers are freed from detailed management of ticks, such as writing code to actually start and stop ticking.

In some embodiments, tick subscriptions are done dynamically, adding and/or removing individual subsystems as subscribers to a central ticking manager. The central ticking manager will send or withhold ticks as instructed, so that the application gets time to work or is allowed to sleep, as the case may be. Dynamic changes in tick subscriptions may occur while the application is executing, e.g., even while a visual tree or other user interface of the application is being built or modified.

Some embodiments described herein may be viewed in a broader context. For instance, concepts such as periodicity, latency, subscription to a service, and finding a greatest common divisor may be relevant to a particular embodiment. However, it does not follow from the availability of a broad context that exclusive rights are being sought herein for abstract ideas; they are not. Rather, the present disclosure is focused on providing appropriately specific embodiments. Other configured media, systems, and methods involving subscriber-based models and/or ticking models are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, other mobile devices having at least a processor and a memory, and/or other device(s) providing one or more processors controlled at least in part by instructions. The instructions may be in the form of firmware or other software in memory and/or specialized circuitry. In particular, although it may occur that many embodiments run on mobile phones (e.g., smart phones), other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, BIOS code, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand on paper or in a person's mind; they are performed with a machine. However, "automatically" does not necessarily mean "immediately".

Throughout this document, use of the optional plural "(s)" means that one or more of the indicated feature is present. For example, tick(s)" means "one or more ticks" or equivalently "at least one tick".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "transmitting", "sending", "issuing", or "communicating" to a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a signal on a wire, for example.

Operating Environments

With reference to FIG. 1, an operating environment 100 for an embodiment may include a computer system 102, such as a mobile phone, a laptop, or the like. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer system devices not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The storage media 112 may be volatile memory, non-volatile memory, fixed in place media, removable media, magnetic media, and/or optical media, as opposed to media such as a wire that merely propagates a signal. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed by model-based ticking subscription with variances as discussed herein, e.g., by sending, receiving, determining, ascertaining, selecting, binding, deployment, execution, modification, display, creation, loading, and/or other operations.

Applications 120 having processes 122 (defined broadly to include threads, tasks, and other executable code portions) and a user interface 124 (which may include a Microsoft® Windows Presentation Foundation visual tree 126), other software, and other items shown in the Figures may reside partially or entirely within one or more media 112, thereby configuring those media. Many environments include an application platform 128, such as the Microsoft® Application Platform and/or another combination of hardware architecture and software framework that allows application software to run and facilitates development of applications. An operating environment may also include other hardware, such as a display 130, buses, power supplies, and accelerators, for instance.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
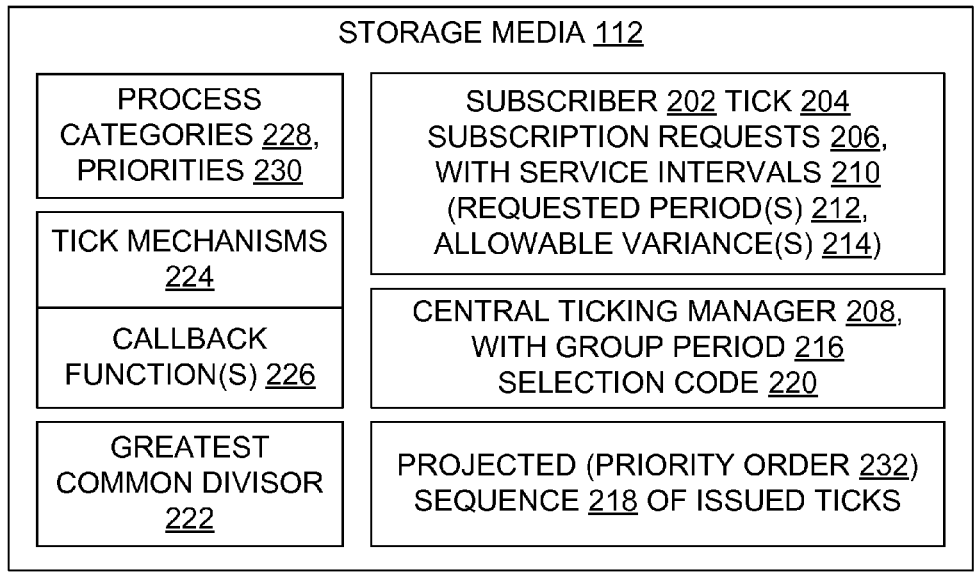
FIG. 2 is a block diagram illustrating an example architecture for subscriber-based ticking with allowable variances.

FIG. 2 illustrates a subscriber-based ticking architecture which is suitable for use with some embodiments. A process 122 can become a subscriber 202 to receive ticks 204 by submitting (or having submitted on its behalf) a subscription request 206. The tick subscription request 206 is sent to a central ticking manager 208. The request indicates that the subscriber wishes to receive ticks based on parameters supplied to the manager 208 in the request or by other mechanisms (e.g., in a previous transmittal to the ticking manager, hard-coded default value, or configuration file value).

In some embodiments, a given process 122 may subscribe zero, one, or more times. For example, a process may subscribe to request ticks at 100 millisecond intervals to check for network requests, and also subscribe to request ticks at 10 millisecond intervals to handle rendering operations. In general, the subscription request specifies, or helps specify, a service interval 210 for the subscriber's requested ticks. Each service interval 210 includes an inner point and an indication of how far the ticks can depart from that inner point.

In some embodiments, the inner points are specified as requested periods 212, with the permitted departures from the inner point specified as allowable variances 214. For example, a request 206 may specify one tick every 100 milliseconds, give or take 15 milliseconds. In this example, the requested period is 100 milliseconds. The allowable variance may be defined either as 15 milliseconds (if the "give or take" is presumed and the variance is understood to be equal on both sides to a distance of 15 milliseconds) or as 30 milliseconds (if the requested period is presumed to be at the center of the stated variance). Regardless of which definition is chosen for variance, in this example a tick coming 89 milliseconds after the previous tick would be within the service interval, as would a tick coming 113 milliseconds after the previous tick, whereas ticks coming 75 milliseconds or 117 milliseconds after the previous tick would fall outside the service interval 210. For convenience, examples herein generally assume that the requested period is at the center of the stated variance, but in some embodiments the requested period is not centered. For example, a subscription request 206 might specify a service interval with a requested period of 100 milliseconds and with allowable variance endpoints at 95 milliseconds and 115 milliseconds.

The central ticking manager provides a group period 216 for a group of subscribers 202. The group period is selected such that every service interval for the group in question will contain at least one tick when ticks occur periodically at the group period distance from one another. For example, if one subscriber requested ticks every five milliseconds plus or minus two milliseconds, and other subscriber requested ticks every seven milliseconds plus or minus three milliseconds, then taking advantage of the variances allows the group period to be every three milliseconds in a sequence 218 of ticks.

By contrast, assume that variances were not allowed or were ignored when selecting the period to use for a group of processes that receive ticks. In that case, one might simply look at the two requested periods, five and seven, determine that their greatest common divisor (GCD 222) is one, and issue ticks one millisecond apart instead of three milliseconds apart. By taking advantage of the allowable variances, group period selection code 220 in the central ticking manager can lead to issuance of one-third as many ticks in this example, thereby conserving battery charge and CPU cycles on a device such as a mobile phone.

In some embodiments, a tick 204 may result in or take the form of a signal, interrupt, event, message, or another mechanism 224 which alerts the subscribed process to the incoming tick. In some embodiments, the subscription request 206 parameters include a callback function 226 (as a pointer, handle, or other ID), and the central manager sends ticks to the subscriber by invoking the callback function provided by the subscriber.

In some embodiments, a subscribing process 122 categorizes itself, or is categorized by the central ticking manager 208 or by a platform 128. Different categories 228 of process may have different priorities 230 within the central manager. For instance, user interface threads may receive higher priority than non-UI threads. When the manager sends out the ticks for a given instance of the group period, it does so in a priority order 232 that reflects the priorities. Priority order may make a difference in the time at which a process actual receives a tick, for example, when ticks are sent by invoking callback functions.

In some embodiments, applications 120 need not be aware of the central manager 208, other than by subscribing their processes as desired to receive ticks. In some embodiments, applications need not even register or unregister processes themselves; instead an underlying platform 128 can register or unregister the application processes automatically based on what the application is doing. For example, application processes that belong to a user interface 124 can be subscribed with higher priority than processes that belong to an image rendering library.

In some embodiments, ticks 204 continue to be sent by the central manager to the subscriber until the subscriber unsubscribes; in others, subscriptions must be renewed after an elapsed period of time, or a specified number of tick, for instance. In some embodiments, subscriptions can be made and removed dynamically during program execution. In particular, some embodiments allow user interface processes to be subscribed while a visual tree 126 or other program user interface 124 is being built or modified.

With reference to FIGS. 1 and 2, some embodiments provide a computer system 102 with a logical processor 110 and a memory medium 112 configured by circuitry, firmware, and/or software to provide subscriber-based ticking with allowable variances as described herein. A group of tick subscription requests 206 reside in the memory. Each request 206 specifies a subscriber service interval 210, in terms of a requested period 212 and an allowable variance 214 from the service interval. The group does not necessarily contain all of the requests 206 that are present in the memory; requests may be grouped for processing convenience, or due to memory or other resource constraints, for example. A central ticking manager 208 residing in the memory has code 220 that is configured to select a group period 216 for the group of tick subscription requests. Selection of the group period is based at least on the requested periods and the allowable variances, and is made such that a sequence 218 of ticks issued periodically at the group period will provide at least one tick for each interval of each subscription request.

In some embodiments, the central ticking manager 208 is configured to select a group period which is not a divisor of at least one requested period but nonetheless provides for at least one tick within the allowable variance of each interval of the requested period. This was the case with the example given earlier in which the group period of three was not a divisor of either requested period (five, seven). That is, taking advantage of allowable variances permits group periods which are not chosen merely by determining the GCD of the requested periods.

In some embodiments, the system includes a mobile computing device platform 128. The tick subscription requests identify processes 122 which reside in the memory and are configured to execute on the mobile computing device platform.

In some embodiments, the tick subscription requests include multiple requests from a particular process. For instance, a process may submit (or have submitted by the platform on its behalf) a first request to receive ticks at a first requested period to service network I/O, and a second request to receive ticks at a second requested period to service a CPU-bound process.

In some embodiments, the system includes a user interface 124 having threads (an example of processes 122) and also includes non-user-interface threads, such as rendering threads, database search threads, threads for encryption/decryption, threads for compression/decompression, and so on. In such embodiments, the central ticking manager may be configured to give higher priority 230 to user interface threads than it gives to non-user-interface threads, which issuing ticks.

In some embodiments, the system is configured to utilize at least one of the following mechanisms 224 to provide ticks: a software signal, an interrupt, a software event, a software message, a callback function invocation.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

In some embodiments, the selection code 220 is configured to consider variances 214 in calculating an ideal tick issuance time, and assumes that issuing ticks requires only a minimal amount of time per tick and thus ignores the time needed to issue ticks when selecting a group period 216. In some embodiments, the selection code 220 is configured to consider variances 214 by confirming that system tick time latency (the time needed to issue ticks) is within the least of the variances 214.

In some embodiments, the group period 216 is selected as MAX(MIN(allowable variances), GCD(requested periods)). For example, if two requests 206 specify [period 7, variance 2] and [period 11, variance 3] then this approach selects MAX(MIN(2,3),GCD(7,11)) which is MAX(2,1)=2; in this case the group period is ultimately determined by the variances. If two requests 206 specify [period 8, variance 2] and [period 12, variance 3] then this approach selects MAX(MIN (2,3),GCD(8,12)) which is MAX(2,4)=4; in this case the group period is ultimately determined by the GCD of the requested periods. If two requests 206 specify [period 15, variance 4] and [period 6, variance 3] then this approach selects MAX(MIN(4,3),GCD(15,6)) which is MAX(3,3)=3; in this case the group period can be viewed as being ultimately determined by the variances or by the GCD of the requested periods.

More generally, other calculations may be also be used to select a group period 216. In embodiments that take advantage of variances, however, the requested period and the allowable variances are each able to influence the choice, depending on the particular values input to the calculation.

Figure 4:
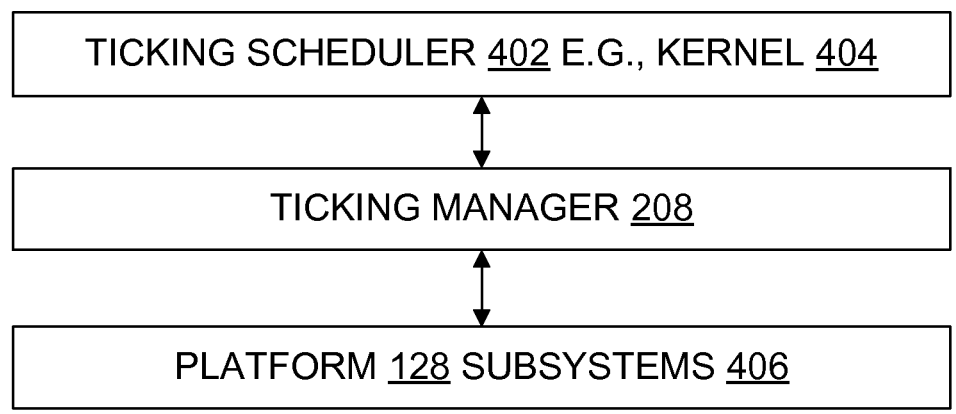
FIG. 4 is a block diagram illustrating another architecture for subscriber-based ticking with allowable variances.

FIG. 4 shows an alternate architecture for subscriber-based ticking with allowable variances. Preliminary ticks are generated for the central ticking manager 208 by a ticking scheduler 402, such as a kernel 404 or portion thereof. This may be accomplished using a hardware clock, countdown register with interrupts, or other reliable mechanism for generating ticks at the highest frequency the system is expected to ever need, for example. Application subsystems 406, such as processes 122, subscribe with the manager 208 to receive ticks based on a requested period 212 and allowable variance 214 as discussed elsewhere herein. Subsystems may be limited in some embodiments to platform subsystems that honor third party markups and code. Subsystems may be automatically subscribed by the platform, rather than subscribing themselves.

Methods

Figure 3:
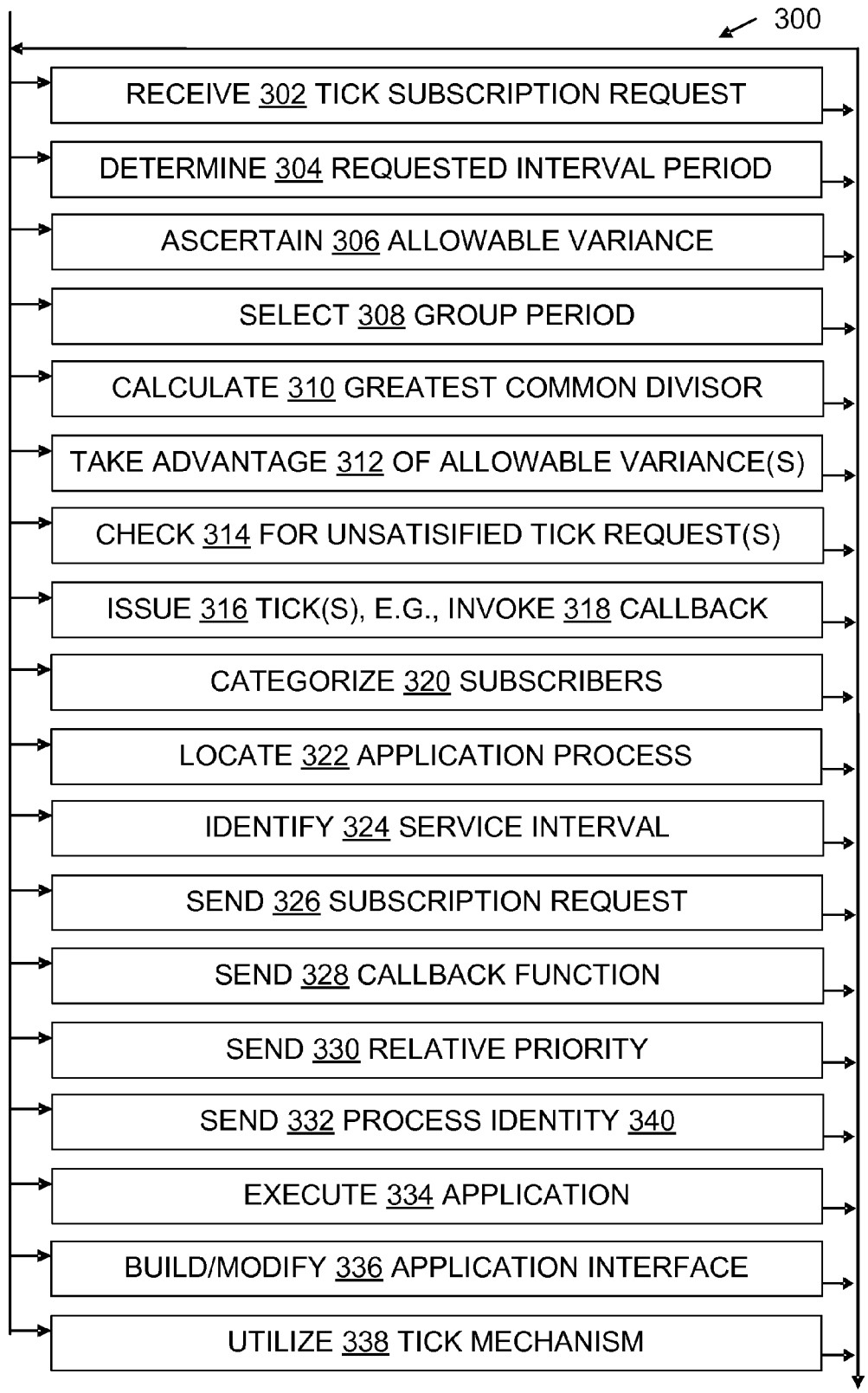
FIG. 3 is a flow chart illustrating steps of some method and configured storage medium embodiments.

FIG. 3 illustrates some method embodiments in a flowchart 300. Methods shown in the Figures may be performed in some embodiments automatically, e.g., by a platform 128 and/or central ticking manager 208 which require little or no user input to perform subscriptions and issue ticks at a selected group period. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 3. Steps may be performed serially, in a partially overlapping manner, or fully in parallel. The order in which flowchart 300 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a subscription request receiving step 302, an embodiment receives a tick subscription request 206; for example, the request 206 may be received by a central ticking manager 208 or by a process or buffer acting on behalf of the manager 208. Step 302 may be accomplished using interprocess communication, XML, other networked communication, direct memory writes, software messages, shared files or other shared memory, and/or other communication mechanism(s), for example.

During a requested period determining step 304, an embodiment determines a requested period 212; for example, the requested period 212 may be determined by a central ticking manager 208 or by a process acting on behalf of the manager 208. Step 304 may be accomplished by reading a field of a subscription request 206, by looking up the period 212 in a table or other data structure based on the subscriber ID or category 228 read from the request 206, or by reading a period 212 previously supplied to the manager 208 in a configuration file or other structure, for example.

During an allowable variance ascertaining step 306, an embodiment determines an allowable variance 214; for example, the allowable variance 214 may be determined by a central ticking manager 208 or by a process acting on behalf of the manager 208. Step 306 may be accomplished by reading a field of a subscription request 206, by looking up the variance 214 in a table or other data structure based on the subscriber ID or category 228 read from the request 206, or by reading a variance 214 previously supplied to the manager 208 in a configuration file or other structure, for example.

During a group period selecting step 308, an embodiment selects a group period 216 for some group of two or more subscription requests 206. For example, the group period 216 may be selected by a central ticking manager 208 or by a process acting on behalf of the manager 208, using selection code 220. Step 308 may be accomplished by calculations such as those illustrated herein or other calculations which take advantage of the allowable variance, as opposed to relying solely on the requested periods (and in particular, as opposed to relying solely on the greatest common divisor of the requested periods).

However, in some embodiments step 308 involves calculating 310 a GCD of requested periods, calculating 310 a GCD of variances (or of values less than the minimum allowable variance), or calculating 310 GCDs of requested periods and of allowable variances. Calculating such GCDs is one of the ways to provide input (periods 212 and/or variances 214) with influence over the group period 216, that is, of basing the group period on at least requested periods 212 and allowable variances 214. To the extent the selected group period 216 is not necessarily the GCD of the requested periods 216, the selection 308 takes advantage 312 of the allowable variances 214.

During a checking step 314, an embodiment checks for some any unsatisfied subscription requests 206, using flags or other data structures, for instance. For example, the check may be performed by a central ticking manager 208 or by a process acting on behalf of the manager 208, each time a group period 216 elapses.

Different embodiments may have different policies regarding issuance of ticks more than once for a given subscription request 206 during a given service interval 210. One policy permits multiple ticks, for subscribers who need a tick at least once per service interval. Another policy requires a single tick per service interval, thereafter disallowing additional tick(s) in a given interval.

For example, consider the case in which two requests 206 A and B specify [period 7, variance plus or minus 2] and [period 11, variance plus or minus 3] respectively, and the selected group period is 2. At the first group period elapsed point, 2, the check 314 will show that no request is unmet and thus no ticks will be issued 316. The same holds true at timeline point 4. At timeline point 6, however, the manager's check 314 will show that the period 7 request is unmet and that 6 is within the allowable variance, so a tick will be issued 316 to the subscriber associated with request A. At timeline point 8, the policy on multiple ticks per service interval will come into play, because 8 is within the allowable variance of the period 7 request that is centered at timeline point 7, but a tick has already been issued for that service interval 210 (the timeline point 5 to timeline point 9 interval).

Tick issuing step 316 may be accomplished using hardware and/or software interrupts, invocation 318 of callback functions, semaphores, messages, events, and/or other mechanisms 224.

During a categorizing step 320, an embodiment categorizes subscriber(s) 202 for the purpose of giving some subscriber(s) higher priority 230 so they are issued ticks sooner than lower priority subscribers during a given check-and-issue cycle (steps 314 and 316). For example, the categorization may be performed by a central ticking manager 208, by a platform 128, or by a process acting on behalf of either. Step 320 may be accomplished by reading a category field of a subscription request 206, by looking up the category 228 in a table or other data structure based on a subscriber ID read from the request 206, or by reading a category 228 previously supplied to the manager 208 or the platform 128 in a configuration file or other structure, for example.

During a locating step 322, an embodiment locates an application process 122 which requires periodic servicing at an interval. For example, the locating may be performed by a platform 128, or by a process acting on its behalf. Step 322 may be accomplished using a registry, kernel data structures or tools for listing active processes, and a table, configuration file, or other data structure which lists processes that require periodic servicing, for example. The periodic servicing requirement may also be inferred in some embodiments from the apparent nature of a process, such as a network I/O process, a rendering process, a user-interface process, and so on.

During an interval identifying step 324, an embodiment identifies a service interval 210 for a process 122. For example, the service interval 210 may be identified by a central ticking manager 208, a platform 128, or by a process acting on behalf of either or both. In general, interval identifying step 324 will identify service intervals by identifying periods 212 and corresponding variances 214. Step 324 may be accomplished using a table, configuration file, or other data structure which lists process service intervals, for example. The service interval 210 may also be inferred in some embodiments from the apparent nature of a process, such as a network I/O process, a rendering process, a user-interface process, and so on, using default or user-configured values.

During a request sending step 326, an embodiment sends a tick subscription request toward a central ticking manager 208; the request may be sent by a process 122 or by a platform 128 acting on behalf of the process, for example. Request sending step 326 corresponds generally with request receiving step 302, and hence may be accomplished using corresponding mechanisms.

During a callback function sending step 328, an embodiment sends a callback function 226 toward a central ticking manager 208; the callback function 226 may be sent by a process 122 or by a platform 128 acting on behalf of the process, for example. Callback functions may be identified by handles, pointers, registry entries, vector table indices, and/or other mechanisms; it is generally unnecessary to send a copy of the entire function code, although that may be done in some embodiments. Sending step 328 may be accomplished using mechanisms such as those used in sending 326 subscription requests, for example, and may be part of step 326.

During a priority sending step 330, an embodiment sends a subscription request's relative priority toward a central ticking manager 208; the priority 230 may be sent by a process 122 or by a platform 128 acting on behalf of the process, for example. Priorities may be integer or other enumerated discrete values, for example. Sending step 330 may be accomplished using mechanisms such as those used in sending 326 subscription requests, for example, and may be part of step 326.

During a process identity sending step 332, an embodiment sends a subscription request's subscriber 202 identity 340 toward a central ticking manager 208; the identity 340 may be sent by a process 122 or by a platform 128 acting on behalf of the process, for example. Identities 340 may be process IDs used in a kernel, registry entries, and/or other process (task, thread, coroutine, etc.) identifiers, for example. Sending step 332 may be accomplished using mechanisms such as those used in sending 326 subscription requests, for example, and may be part of step 326.

During an application executing step 334, an embodiment executes an application 120. Execution may include running executable code and/or interpreting code, as noted earlier. Familiar mechanisms may be used to execute 334 the application, but execution is noted here because other steps discussed herein (such as steps 302-332) may be performed in some embodiments during execution 334.

During an interface building and/or modifying step 336, an embodiment builds and/or modifies an application 120 user interface 124. Familiar mechanisms may be used to build and/or modify the application interface, but step 336 is noted here because other steps discussed herein (such as steps 302-332) may be performed in some embodiments during step 336.

During a utilizing step 338, an embodiment utilizes a mechanism to provide ticks, such as a software signal, an interrupt, a software event, a software message, callback function, or other mechanism 224.

The foregoing steps and their interrelationships are discussed in greater detail below, in connection with various embodiments.

Some embodiments provide a method for subscriber-based ticking with allowable variances, from a subscription manager perspective. Some methods include receiving 302 at a central ticking manager a plurality of tick subscription requests from tick subscriber(s). Each subscription request includes a request that a tick be issued within specified repeating intervals 210 which are defined by a requested period and an allowable variance. An embodiment may buffer some requests 206 to deal with later, or otherwise group requests 206. Accordingly, a "group" of requests is not necessarily all of the requests that have been received 302. Also, in some embodiments a given subscriber 202 may make multiple requests, and hence reference may be made to "subscriber(s)" even though there are multiple requests.

Some embodiments also include determining 304 the repeating interval requested period for each tick subscription request, and ascertaining 306 the repeating interval allowable variance for each tick subscription request. Some embodiments then select 308 a group period for the tick subscription requests, based at least on the requested period(s) and the allowable variance(s). Selection 308 is performed such that a sequence of ticks issued periodically at the group period would provide at least one tick for each interval of each subscription request. In some embodiments, multiple requests 206 might have the same requested period 212 and/or the same allowable variance 214, hence reference may be made to "period(s)" and "variance(s)" even though there are multiple requests.

In some embodiments, the receiving step 302 includes receiving from a particular subscriber 202 multiple subscription requests 206 which specify different repeating intervals 210 for ticks.

In some embodiments, the selecting step 308 includes calculating 310 a greatest common divisor of the requested periods. In some, the selecting step selects 308 a group period 216 which is not a divisor of at least one requested period but nonetheless provides for at least one tick within the allowable variance of each interval 210 of the requested period.

In some embodiments, the method includes checking 34 each group period for any unsatisfied tick requests and also includes issuing 316 tick(s) to satisfy any such requests. In some, the method includes issuing 316 ticks by repeatedly invoking 318 a callback function which was provided to the central ticking manager by one of the subscriber(s). In some embodiments, the method includes categorizing 320 subscribers and issuing 316 ticks in a priority order which depends at least in part on subscriber categories.

Some embodiments provide a method for subscriber-based ticking with allowable variances, from a subscriber perspective. Some methods performed by a platform 128, for example, include locating 322 an application process which requires periodic servicing at an interval, identifying 324 a service interval for the application process, and sending 326 a central ticking manager a tick subscription request on behalf of the application process. The tick subscription request specifies the service interval 210 as a requested period 212 and also specifies an allowable variance 214 from the service interval.

In some embodiments, the method sends 326 the central ticking manager a second tick subscription request on behalf of the application process. The subscription requests specify different service intervals 210, based for example on differences in expected activity by the application process in response to the ticks, on latency or bandwidth or other performance constraints, or on other criteria.

In some embodiments, the method sends 328 the central ticking manager a callback function to be invoked on behalf of the application process each service interval.

In some embodiments, the sending step 326 occurs during execution on the platform of an application which owns the application process. In particular, in some the sending step 326 occurs while a user interface of the application is being built or modified 336 during execution on the platform of the application which owns the application process. Even more specifically, in some embodiments the sending step 326 occurs while a visual tree 126 of the application is being modified 336 on the platform, rather than waiting until the visual tree is finished.

In some embodiments, the method includes sending 330 the central ticking manager an indication of the application process's priority relative to other processes.

Configured Media

Some embodiments include a configured computer-readable storage medium 112. Medium 112 may include disks (magnetic, optical, or otherwise), RAM, EEPROMS or other ROMs, and/or other configurable memory, as opposed to wires and other propagated signal media. The storage medium which is configured may be in particular a removable storage medium 114 such as a CD, DVD, or flash memory. A general-purpose memory, which may be removable or not, and may be volatile or not, can be configured into an embodiment using items such as subscription requests 206, a central ticking manager 208, and/or group period selection code 220 (in a manager 208 or otherwise) which takes advantage of allowable variances 214, in the form of data 118 and instructions 116, read from a removable medium 114 and/or another source such as a network connection, to form a configured medium. The configured storage medium 112 is capable of causing a computer system to perform process steps for transforming data through subscriber-based ticking with allowable variances as disclosed herein. FIGS. 1 through 4 thus help illustrate configured storage media embodiments and process embodiments, as well as system and process embodiments. In particular, any of the process steps illustrated in FIG. 3 or otherwise taught herein, may be used to help configure a storage medium to form a configured medium embodiment.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIG. 3 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A computer-readable storage medium configured with data and with instructions that when executed by at least one processor causes the processor(s) to perform a method for subscriber-based ticking with allowable variances, the method comprising the steps of:

receiving, at a central ticking manager, a plurality of tick subscription requests from tick subscriber(s) via a platform, wherein the tick subscriber(s) are application process(es) and the receiving occurs while user interface code of the application process is being built or modified during execution of an application which owns the application process, each said subscription request being generated by the platform and including a request that a tick be issued within specified repeating intervals which are defined by a requested period and an allowable variance; and selecting a group period for the tick subscription requests based at least on the requested period(s) and the allowable variance(s), such that a sequence of ticks issued periodically at the group period would provide at least one tick for each interval of each said subscription request.

2. The configured medium of claim 1, wherein the receiving step comprises receiving from a particular subscriber multiple subscription requests which specify different repeating intervals for ticks.

3. The configured medium of claim 1, wherein the selecting step comprises calculating a greatest common divisor of the requested periods.

4. The configured medium of claim 1, wherein the selecting step selects a group period which is not a divisor of at least one requested period but nonetheless provides for at least one tick within the allowable variance of each interval of the requested period.

5. The configured medium of claim 1, wherein the method further comprises checking each group period for any unsatisfied tick requests and issuing tick(s) to satisfy any such requests.

6. The configured medium of claim 1, wherein the method further comprises issuing ticks by repeatedly invoking a callback function which was provided to the central ticking manager by one of the subscriber(s).

7. The configured medium of claim 1, wherein the method further comprises categorizing subscribers and issuing ticks in a priority order which depends at least in part on subscriber categories.

8. A method for subscriber-based ticking with allowable variances, the method comprising the steps of:

a platform locating application processes, each of which requires periodic servicing at an interval; and the platform sending a central ticking manager of the platform a plurality of tick subscription requests on behalf of the located application processes acting as tick subscribers, each of the plurality of tick subscription requests received at the central ticking manager specifying a service interval as a requested period and an allowable variance from the service interval, and wherein the sending and/or receiving of said subscription requests occurs while user interface code of the application process is being built or modified during execution of an application which owns the application process; and the central ticking manager selecting a group period for the tick subscription requests based at least on the requested period(s) and the allowable variance(s), such that a sequence of ticks issued periodically at the group period would provide at least one tick for each interval of each said subscription request.

9. The method of claim 8, further comprising sending the central ticking manager a second tick subscription request on behalf of an application process, wherein the subscription requests for that application process specify different service intervals based on differences in expected activity by the application process in response to the ticks.

10. The method of claim 8, further comprising sending the central ticking manager a callback function to be invoked on behalf of an application process each service interval.

11. The method of claim 8, wherein the sending step occurs while a visual tree of the application which owns the application process is being modified on the platform.

12. The method of claim 8, further comprising sending the central ticking manager an indication of an application process's priority relative to other processes.

13. A computing system comprising:
a logical processor which includes hardware;
a memory in operable communication with the logical processor;
a platform having code residing in the memory, the code configured to locate application processes, each of which requires periodic servicing at an interval, and send a group of tick subscription requests to a central ticking manager of the platform, wherein each request of the group of tick subscription requests specifies a subscriber service interval as a requested period and an allowable variance from the service interval, wherein each request in the group of application process tick subscription requests is from an application process acting as a tick subscriber, each said application process is owned by an application in a set of one or more applications, and wherein the sending occurs while user interface code of the respective application process is being built or modified during execution of the application; and
the central ticking manager of the platform residing in the memory and having code configured to select a group period for the group of tick subscription requests based at least on the requested periods and the allowable variances, such that a sequence of ticks issued periodically at the group period will provide at least one tick for each interval of each said subscription request.

14. The system of claim 13, wherein the system comprises a mobile computing device platform, and the tick subscription requests identify processes which reside in the memory and are configured to execute on the mobile computing device platform.

15. The system of claim 13, wherein the tick subscription requests comprise a first request to receive ticks at a first requested period to service network I/O, and a second request to receive ticks at a second requested period to service a CPU-bound process.

16. The system of claim 13, wherein the system further comprises a user interface having threads and also comprises non-user-interface threads, and the central ticking manager is configured to give higher priority to user interface threads than non-user-interface threads.

17. The system of claim 13, wherein the system is configured to utilize at least one of the following mechanisms to provide ticks: a software signal, an interrupt, a software event, a software message.

18. The system of claim 13, wherein the central ticking manager is configured to select a group period which is not a divisor of at least one requested period but nonetheless provides for at least one tick within the allowable variance of each interval of the requested period.

19. The method of claim 8, wherein the method further comprises checking for unsatisfied tick requests and issuing tick(s) to satisfy any such requests.

20. The method of claim 8, wherein the method further comprises categorizing subscribers and issuing ticks in a priority order which depends at least in part on subscriber categories.

* * * * *